(12) United States Patent
Macias et al.

(10) Patent No.: US 9,894,502 B2
(45) Date of Patent: Feb. 13, 2018

(54) FLOOR IDENTIFICATION FOR EMERGENCY CALLS

(71) Applicant: Verizon Patent and Licensing Inc., Arlington, VA (US)

(72) Inventors: John F. Macias, Antelope, CA (US); Lalit R. Kotecha, San Ramon, CA (US); Thomas H. Tan, San Jose, CA (US); Thaddeus J. Dudziak, Pleasanton, CA (US); Kent W. Hughes, Oakland, CA (US); Mingxing S. Li, San Jose, CA (US); Sagiv Draznin, Walnut Creek, CA (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 49 days.

(21) Appl. No.: 14/284,029

(22) Filed: May 21, 2014

(65) Prior Publication Data

US 2015/0341765 A1   Nov. 26, 2015

(51) Int. Cl.
    *H04W 4/22*   (2009.01)
    *H04W 4/04*   (2009.01)
    *H04W 64/00*  (2009.01)

(52) U.S. Cl.
    CPC ............. *H04W 4/22* (2013.01); *H04W 4/043* (2013.01); *H04W 64/00* (2013.01)

(58) Field of Classification Search
    CPC ........................................................ H04W 4/22
    See application file for complete search history.

(56) References Cited

U.S. PATENT DOCUMENTS

| | | | |
|---|---|---|---|
| 2005/0176406 A1* | 8/2005 | Krishnakumar | G01S 5/02 455/410 |
| 2005/0176441 A1* | 8/2005 | Jurecka | G01S 19/09 455/456.1 |
| 2009/0291663 A1* | 11/2009 | Schultz | H04M 3/465 455/404.2 |
| 2013/0035109 A1* | 2/2013 | Tsruya | G01S 5/0252 455/456.1 |
| 2014/0031003 A1* | 1/2014 | Shugart | G01S 5/02 455/404.2 |
| 2015/0312738 A1* | 10/2015 | Deich | H04W 4/22 370/328 |
| 2016/0037305 A1* | 2/2016 | Pan | G01S 5/0252 455/456.1 |

* cited by examiner

*Primary Examiner* — Mazda Sabouri

(57) ABSTRACT

A system may be configured to determine a floor of a building in which the user device is located at a time a call was placed. The information, indicating the determined floor, may be provided to a callee, such as a public safety answering point ("PSAP"). The floor may be determined based on, for example, comparing an altitude of the user device and/or a list of networks or devices that are visible to the user device, to a set of reference information.

20 Claims, 7 Drawing Sheets

500

| SSID/Device ID | Transmit Power (mW) | Floor | Additional Information |
|---|---|---|---|
| SSID123 | 100 | 1 | {Address, Building Name, Access Codes, ... } |
| BT123 | 10 | G1 | {Address, Building Name, Access Codes, ... } |
| SSID321 | 15 | 2 | {Address, Building Name, Access Codes, ... } |
| BT432 | 50 | 3 | {Address, Building Name, Access Codes, ... } |

| Location | Floor Height (m) | Floor Height Offset (m) |
|---|---|---|
| Location_1 | 3.0 | 1,000 |
| Location_2 | 2.9 | 0 |
| Location_3 | 3.3 | -10 |

| Altitude Range (m) | Floor |
|---|---|
| 5.0-8.2 | 1 |
| 8.3-9.5m | 2 |
| 9.5m-13.0m | 3 |

FLOOR IDENTIFICATION FOR EMERGENCY CALLS

BACKGROUND

Situations often arise, in which an individual needs to be located quickly. For example, in an emergency situation, an individual may dial "911." The individual's general location (e.g., latitude and longitude) may be ascertained using, for example, enhanced 911 ("E911") techniques.

BRIEF DESCRIPTION OF THE DRAWINGS

FIGS. 5-7 illustrate example data structures, which may be used to aid in determining a floor, in a multi-story structure, on which a user device is located;

DETAILED DESCRIPTION OF PREFERRED EMBODIMENTS

The following detailed description refers to the accompanying drawings. The same reference numbers in different drawings may identify the same or similar elements.

Figure 1:
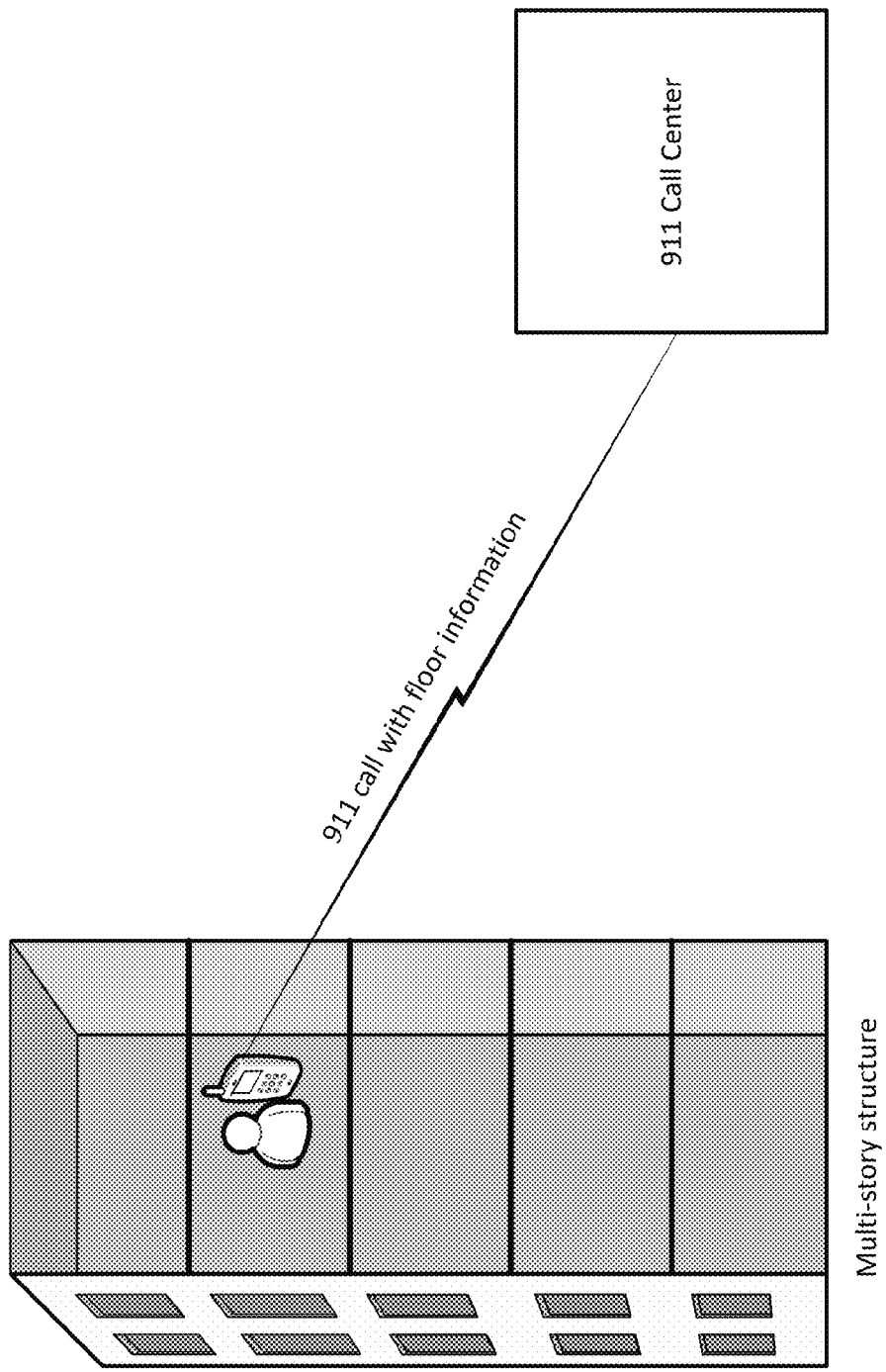
FIGS. 1-3 illustrate an example overview of one or more implementations described herein.

As provided herein, some implementations may allow for the identification of a floor, in a multi-story structure, from which a user device (e.g., a mobile telephone) places a call. For example, as shown in FIG. 1, a user may place a 911 call from the fourth floor of a five-floor building. In accordance with some implementations, information identifying that the user is on the fourth floor may be provided to a public safety answering point ("PSAP"), such as a 911 call center.

Traditionally, the user's general location (e.g., a set of latitude and longitude coordinates) could be determined (e.g., using E911 techniques). However, in situations where a particular set of coordinates covers a large number of floors (such as in skyscrapers and/or other multi-story structures), the user may not be easily located based on coordinates alone. Providing floor information in addition to coordinates, in accordance with one or more implementations, would allow the user to be located more quickly.

Figure 2:
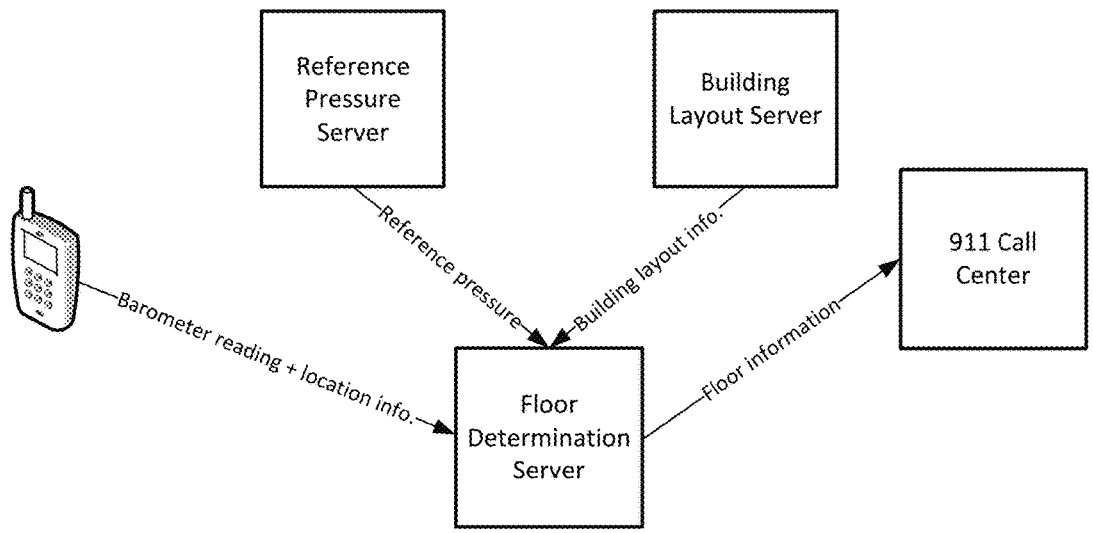

As described herein, the floor, from which a user is calling, may be identified in a variety of ways. For example, as shown in FIG. 2, a floor determination server may receive a barometer reading from the user device, which may indicate a measured atmospheric pressure at the time a phone call was placed. The floor determination server may also receive location information regarding the user device, which may include latitude and longitude coordinates at which the user device was located at the time the phone call was placed.

The floor determination server may also receive a reference atmospheric pressure from, for example, a reference pressure server (e.g., from a server provided by the National Weather Service and/or another provider). The reference atmospheric pressure may be obtained from a location that is relatively near the user device (e.g., within the same ZIP code). As another example, the reference atmospheric pressure may be received from a reference barometer device within or near the building (e.g., from a set of barometers within the building, of which two or more barometers are located on different floors). The information received from the reference pressure server (and/or the reference barometer device) may additionally indicate an altitude at which the reference pressure was measured (e.g., a height above or below mean sea level). Based on a comparison of the reference atmospheric pressure, the altitude at which the reference atmospheric pressure was measured, and the barometer reading from the user device, the floor determination server may identify an altitude associated with the user device.

The floor determination server may also receive building layout information from a building layout server. The building layout information may pertain to a building that is identified based on the location of the user device. The building layout information may, for example, indicate altitudes associated with floors of the building. The floor determination server may compare the identified altitude of the user device to the building layout information to identify on which floor, of the building, the user device is located. The floor determination server may notify a callee of the call (e.g., a PSAP) regarding the identified floor.

Figure 3:
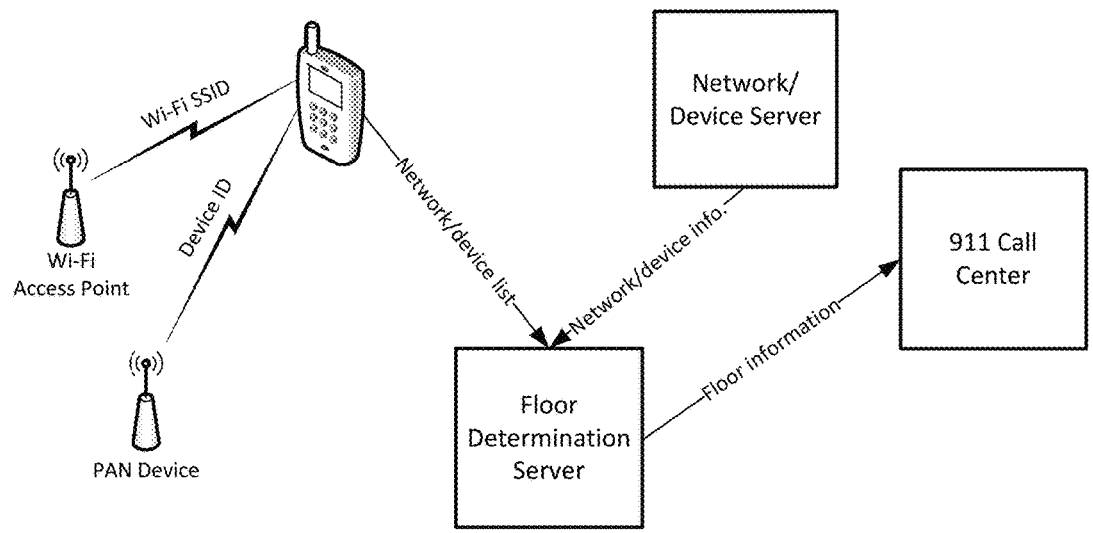

FIG. 3 illustrates another example of how the floor, from which a call is placed, may be identified. As shown in FIG. 3, a number of Wi-Fi access points and/or personal area network ("PAN") devices (such as Bluetooth® devices) may be present in the building in which the user device is located. The user device may detect the presence of these Wi-Fi access points and/or PAN devices based on discovery beacons provided by the Wi-Fi access points and/or PAN devices. For example, a Wi-Fi access point may broadcast a service set identifier ("SSID"), which may indicate to other devices that the Wi-Fi access point is present. As another example, a PAN device may broadcast a name or other identifier associated with the PAN device, which may indicate to other devices that the PAN device is present.

When the user device has placed a call (e.g., a 911 call), the floor determination server may receive a list of the networks and/or devices that are visible to the user device at the time the call was placed. The list may include, for example, a set of SSIDs, PAN device identifiers, etc. The floor determination server may receive information from a network/device server, which may indicate floors of a building that are associated with various SSIDs, PAN device identifiers, etc. Based on comparing the network/device list, received from the user device, to the information received from the network/device server, the floor determination server may be able to determine a floor of a building at which the user device is located. The floor determination server may notify a callee of the call (e.g., a PSAP) regarding the identified floor.

Figure 4:
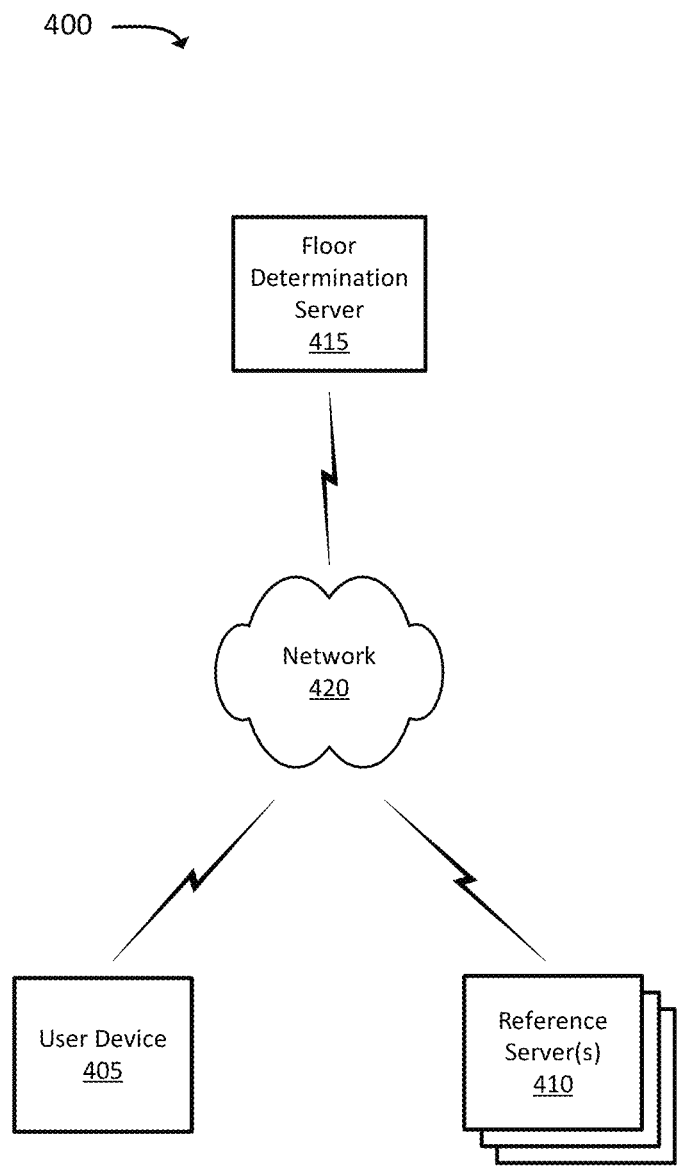
FIG. 4 illustrates an example of an environment, in which systems and/or methods, described herein, may be implemented.

FIG. 4 illustrates an example environment 400, in which systems and/or methods described herein may be implemented. As shown in FIG. 4, environment 400 may include user device 405, one or more reference servers 410, floor determination server 415, and network 420.

The quantity of devices and/or networks, illustrated in FIG. 4, is provided for explanatory purposes only. In practice, environment 400 may include additional devices and/or networks; fewer devices and/or networks; different devices and/or networks; or differently arranged devices and/or networks than illustrated in FIG. 4. Alternatively, or additionally, one or more of the devices of environment 400 may perform one or more functions described as being performed by another one or more of the devices of environments 400. Devices of environment 400 may interconnect with each other and/or other devices via wired connections, wireless connections, or a combination of wired and wireless connections.

User device 405 may include any computation and communication device, such as a wireless mobile communication device that is capable of communicating with one or more networks (e.g., network 420). For example, user device 405 may include a radiotelephone; a personal communications system ("PCS") terminal (e.g., a device that combines a cellular radiotelephone with data processing and data communications capabilities); a personal digital assistant ("PDA") (e.g., that can include a radiotelephone, a pager, Internet/intranet access, etc.); a smart phone; a laptop computer; a tablet computer; a camera; a set-top device ("STD"), a personal gaming system, a wearable device, and/or another type of mobile computation and communication device. User device 405 may receive connectivity to network 420 via services provided by a service provider, such as an Internet service provider ("ISP"). An ISP may, in some implementations, be a wireless telecommunications provider (e.g., a cellular telecommunications provider).

User device 405 may include logic and/or circuitry (e.g., global positioning system "GPS" capability) that may be used to determine a geographical location associated with user device 405. In some implementations, user device 405 may include, and/or may be associated with, logic and/or circuitry to measure atmospheric pressure (e.g., a barometer). User device 405 may communicate with floor determination server 415 via network 420. In some implementations, user device 405 may be configured to output information (e.g., GPS information, barometer information, and/or other information) when user device 405 places a telephone call (e.g., whenever user device 405 makes a telephone call, and/or only when user device 405 makes a certain type of telephone call, such as a 911 call). In some implementations, user device 405 may output the information in response to a request (e.g., a request from floor determination server 415). Additionally, or alternatively, user device 405 may periodically or intermittently output the information (e.g., every hour, every minute, whenever user device 405 changes location, etc.) to floor determination server 415 and/or another device.

Reference servers 410 may include one or more server devices, from which reference information is received, which may be used to aid in determining a floor on which user device 405 is located when user device 405 places calls. Different reference servers 410 may be associated with different providers. For example, one reference server 410 may be provided by an entity that provides public weather information, while another reference server 410 may be a private server that is owned and/or operated by the same entity that owns and/or operates floor determination server 415. Examples of data, that may be stored by one or more reference servers 410 (and/or based on information provided by reference servers 410), are described below with respect to FIGS. 5-7.

Floor determination server 415 may include one or more server devices that determine a floor of building, from which a call is placed by user device 405. As described below, floor determination server 415 may determine the floor based on information regarding user device 405 (e.g., location information, barometer readings, and/or other information), as well as reference information received from reference server 410. Floor determination server 415 may output the location information to a callee associated with the call placed by reference server 410, and/or to another device.

Network 420 may include one or more networks, via which user device 405, reference server 410, and/or floor determination server 415 may communicate. For example, network 420 may include an evolved packet system ("EPS") that includes a Long Term Evolution ("LTE") network and/or an evolved packet core ("EPC") network that operate based on a third generation partnership project ("3GPP") wireless communication standard. The LTE network may be, or may include, a radio access network ("RAN") that includes one or more base stations, some or all of which may take the form of an eNodeB ("eNB"), via which user device 405 and/or another device may communicate with the EPC network. The EPC network may include one or more serving gateways ("SGWs"), mobility management entities ("MMEs"), and/or packet data network ("PDN") gateways ("PGWs"), and may enable user device 405 to communicate with a PDN (e.g., the Internet) and/or an IP Multimedia Subsystem ("IMS") core network. The IMS core network may manage authentication, session initiation, account information, a user profile, etc. associated with user device 405.

Network 420 may additionally, or alternatively, include a wide area network ("WAN"), a metropolitan area network ("MAN"), the Internet, a fiber optic-based network, and/or a combination of these or other types of networks. Network 420 may include one or more wireless networks in addition to, or in lieu of, an LTE network. For example, network 420 may include a Code Division Multiple Access ("CDMA") 2000 1× network, a second generation ("2G") wireless network, a third generation ("4G") wireless network, a fourth generation ("4G") wireless network, a fifth generation ("5G") wireless network, a "Wi-Fi" wireless network (e.g., a network that operates according to an Institute of Electrical and Electronics Engineers ("IEEE") 802.11-based standard), and/or another wireless network. In some implementations, network 420 may be communicatively coupled to one or more other networks.

FIGS. 5-7 illustrate example data structures 500, 600, and 700, respectively, that may be stored by one or more reference servers 410 and/or by floor determination server 415. For example, floor determination server 415 may store data structures 500, 600, and/or 700, based on information received from one or more reference servers 410. The information stored in data structures 500, 600, and/or 700 may aid in determining a floor, of a structure, at which a particular user device 405 is located.

For instance, as shown in FIG. 5, data structure 500 may include information regarding wireless networks and/or PAN devices. For a particular wireless network and/or PAN device, data structure may include identifying information, a transmit power, a floor, and/or additional information. The identifying information may include an SSID and/or another identifier, such as a device name. As discussed above, the identifying information for a particular wireless network and/or PAN device, may correspond to a discovery beacon broadcasted by the wireless network and/or PAN device.

The transmit power information, for a particular wireless network and/or PAN device, may indicate a transmit power (e.g., as expressed in milliwatts ("mW")) of a radio transceiver associated with the wireless network and/or PAN device. As described later, the transmit power may be compared to a signal strength, of signals received by user device 405, in order to better determine the proximity of user device 405 to a particular wireless access point and/or PAN device.

The floor information, for a particular wireless network and/or PAN device, may indicate a floor on which the particular wireless network and/or PAN device is located. In some implementations, the floor information may indicate a range of floors. For example, the additional information may include information that may be useful to emergency responders, such as an address, a name of the building in which the wireless network and/or PAN device is located, access codes to doors of the building, a room number in which the wireless network and/or PAN device are located), and/or other information.

As shown in FIG. 6, data structure 600 may include information regarding floors of several buildings. The information, for a particular building, may include information regarding a location of the building, height of each floor, and a floor height offset. The location may be, for example, an address, a set of latitude and longitude coordinates, or the like. The floor height may be a height of each floor, and the floor height offset may indicate an altitude at which the ground floor is located. For example, the building located at "Location_1" may have a ground floor at 1,000 meters above sea level, and each floor may be 3.0 meters high. Thus, a user device 405, at "Location_1" and at an example altitude of 1,030 meters may be on the tenth floor of the building.

As shown in FIG. 7, data structure 700 may include information regarding floors of a particular building. For example, the information may indicate an altitude range (e.g., a range of meters above sea level) that correspond to floors of the building. As shown, for instance, floor 1 of the building may begin at 5.0 meters above sea level, and may end 8.2 meters above seal level. Thus, an example user device 405, in the building and at 5.5 meters above sea level, would be on floor 1 of the building.

Figure 8:
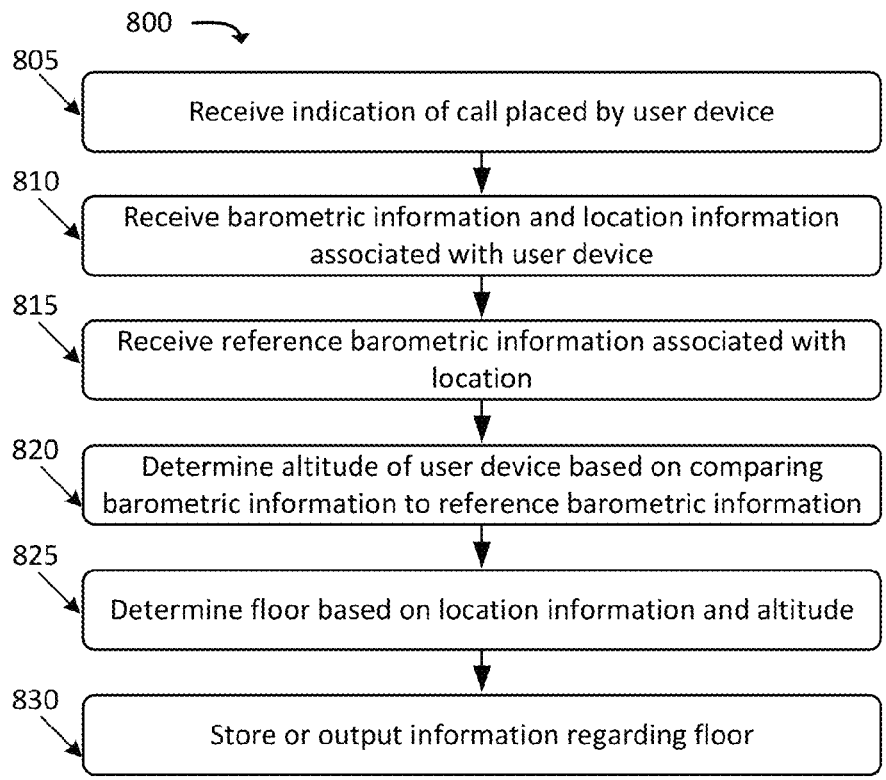
FIG. 8 illustrates an example process for identifying a floor in a multi-story structure, on which a user device is located, based on barometric information.

FIG. 8 illustrates an example process 800 for identifying a floor in a multi-story structure, on which a user device is located, based on barometric information. Process 800 may, in some implementations, be performed by floor determination server 415. In other implementations, some or all of process 800 may be performed by one or more other devices.

Process 800 may include receiving (at 805) an indication of a call placed by a user device. For example, floor determination server 415 may receive an indication from a device (such as a device that performs call control signaling) within a network, associated with user device 405, that a call has been placed by user device 405. Additionally, or alternatively, floor determination server 415 may receive an indication directly from user device 405. In some implementations, the indication may only be provided to floor determination server 415 when the call meets certain criteria (e.g., if the call is an emergency call, such as a 911 call).

The indication may include information that may be used by floor determination server 415 to communicate directly or indirectly with user device 405. For example, the indication may include an Internet Protocol ("IP") address associated with user device 405, a device identifier associated with user device 405, and/or other information. In some implementations, the indication may include information that may be used by floor determination server 415 to communicate with a callee of the call.

Process 800 may also include receiving (at 810) barometric information and location information associated with the user device. For example, floor determination server 415 may request barometric information from user device 405, and/or from another device that receives and/or stores barometric information regarding user device 405. As another example, the indication, received at 805, may include the barometric information. As yet another example, floor determination server 415 may have received the barometric information prior to receiving the indication at 805. For example, in some implementations, user device 405 may periodically and/or intermittently output barometric information to floor determination server 415 and/or another device. As mentioned above, the barometric information may indicate an atmospheric pressure measured by user device 405 and/or another device associated with user device 405.

In some implementations, user device 405 may include logic and/or hardware that communicates with floor determination server 415, in order to provide the barometric information (and/or other information) to floor determination server 415. For instance, user device 405 may run an application, and/or firmware of user device 405 may be suitably configured, that responds to requests from floor determination server 415, detects calls made by user device 405, receives barometric information from a barometer associated with user device 405, and/or performs other functions.

Process 800 may additionally include receiving (at 815) reference barometric information associated with the location. For example, floor determination server 415 may request reference barometric information, based on the location of user device 405, from a particular reference server 410. As mentioned above, the reference barometric information may include a reference atmospheric pressure, as well as an indication of an altitude at which the reference atmospheric pressure was measured. The reference atmospheric pressure may be received from a publicly available source, such as from the National Weather Service, and/or from another source (e.g., reference barometers that are located in or near the building). In some implementations, reference atmospheric pressure from multiple sources may be used. In these implementations, the reference atmospheric pressure readings may be combined (e.g., averaged, averaged in a weighted manner) and/or another function may be performed on the reference atmospheric pressure readings (e.g., discard the higher reading, discard the lower reading, etc.).

Process 800 may further include determining (at 820) an altitude of the user device based on comparing the barometric information, received from the user device, to the reference barometric information. For example, floor determination server 415 may perform a calculation, using a known formula, based on the barometric information, received from user device 405, and the reference barometric information, which may yield the altitude of user device 405.

Process 800 may also include determining (at 825) a floor of a building based on the location information and the altitude. For example, floor determination server 415 may receive and/or store building layout information for a building that corresponds to the location of user device 405. The building layout information may be similar to the examples discussed above with respect to FIGS. 6 and 7. Based on the building layout information and the altitude of user device 405, floor determination server 415 may determine on which floor of the building user device 405 is located.

Process 800 may additionally include storing and/or outputting the information regarding the floor. For example, floor determination server 415 may provide the information, indicating on which floor user device 405 is located, to callee, and/or to another device. For instance, in some implementations, floor determination server 415 may provide the information to a proxy server, which may forward the information to the callee.

Figure 9:
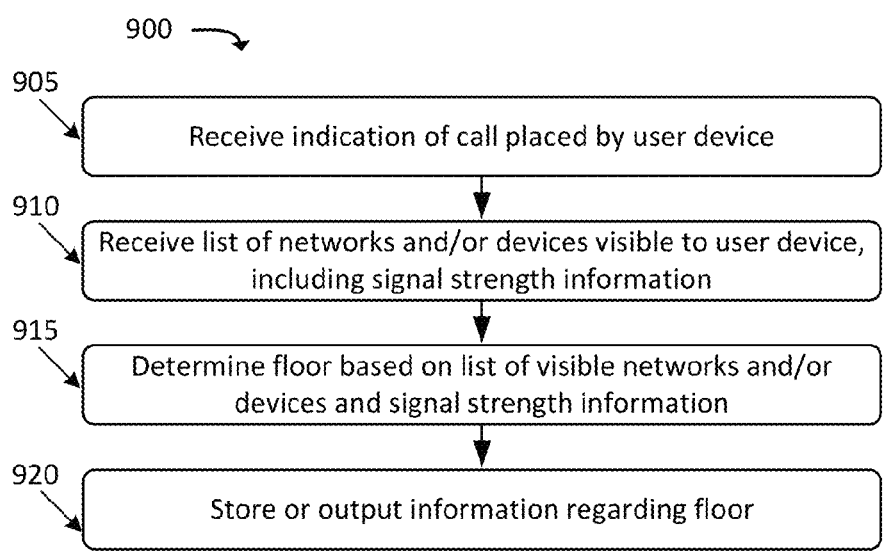
FIG. 9 illustrates an example process for identifying a floor in a multi-story structure, on which a user device is located, based on a list of networks and/or devices that are visible to the user device.

FIG. 9 illustrates an example process 900 for identifying a floor in a multi-story structure, on which a user device is located, based on a list of networks and/or devices that are visible to the user device. Process 900 may, in some implementations, be performed by floor determination server 415. In other implementations, some or all of process 900 may be performed by one or more other devices.

Process 900 may include receiving (at 905) an indication of a call placed by a user device. For example, floor determination server 415 may receive an indication from a device (such as a device that performs call control signaling) within a network, associated with user device 405, that a call has been placed by user device 405. Additionally, or alternatively, floor determination server 415 may receive an indication directly from user device 405. In some implementations, the indication may only be provided to floor determination server 415 when the call meets certain criteria (e.g., if the call is an emergency call, such as a 911 call).

Process 900 may also include receiving (at 910) a list of networks and/or devices visible to the user device. The received list may, in some implementations, include signal strength information for some or all of the visible networks and/or devices. For example, floor determination server 415 may request visible network and/or device information from user device 405. As another example, the indication, received at 805, may include the visible network and/or device information. As yet another example, floor determination server 415 may have received the visible network and/or device information prior to receiving the indication at 805. For example, in some implementations, user device 405 may periodically and/or intermittently output visible network and/or device information to floor determination server 415 and/or another device. As mentioned above, the visible network and/or device information may include identifying information (e.g., SSIDs, device names, etc.) for networks and/or devices that output discovery beacons.

One may appreciate that user device 405 does not need to actively connect to a particular network and/or device in order for the network and/or device to be "visible" to user device 405. In some implementations, the received list may correspond to networks and/or devices with which user device 405 has established a connection (in addition to, or in lieu of, networks and/or devices that are visible to user device 405, but with which user device 405 has not established a connection).

As mentioned above, in some implementations, user device 405 may include logic and/or hardware that communicates with floor determination server 415, in order to provide the information regarding visible networks and/or devices (and/or other information) to floor determination server 415. For instance, user device 405 may run an application, and/or firmware of user device 405 may be suitably configured, that responds to requests from floor determination server 415, detects calls made by user device 405, receives visible network and/or device information from another component user device 405, and/or performs other functions.

Process 900 may further include determining (at 915) a floor of a building, based on the list of visible networks and/or devices. For example, as described above (e.g., with respect to FIG. 5), floor determination server 415 may compare the received list of visible networks and/or devices to information that indicates floors of a building to which the networks and/or devices correspond. In some implementations, floor determination server 415 may make an intelligent determination, based on which floors are identified as being associated with the visible networks and/or devices. For example, assume that floor determination server 415 determines that user device 405 is in range of networks and/or devices on floors 9, 10, and 11. In this situation, user device 405 may determine that user device 405 is located on floor 10. This determination may be based on the assumption or determination that when user device 405 is located on a particular floor, networks and/or devices on other floors may be visible to user device 405.

In some implementations, the determining may further be based on other factors, such as signal strength information for the networks and/or devices. For example, in implementations where floor determination server 415 receives (at 910) signal strength information for visible networks and/or devices, floor determination server 415 may compare the signal strength to an expected signal strength that is based on a transmit power of the networks and/or devices. In some implementations, inferences may be made based on the signal strengths. For example, if a particular network and/or device is associated with a relatively high transmit power, and the particular network and/or device is visible to user device 405, but with a relatively low signal strength, an inference may be made that user device 405 is not on the same floor as the particular network and/or device, or that there are obstructions and/or other sources of interference, which would cause the signal strength to be relatively low. Coupled with signal strength information associated with multiple networks and/or devices, an intelligent determination may be made regarding the floor on which user device 405 is located.

Process 900 may additionally include storing and/or outputting the information regarding the floor. For example, floor determination server 415 may provide the information, indicating on which floor user device 405 is located, to callee, and/or to another device. For instance, in some implementations, floor determination server 415 may provide the information to a proxy server, which may forward the information to the callee.

Figure 10:
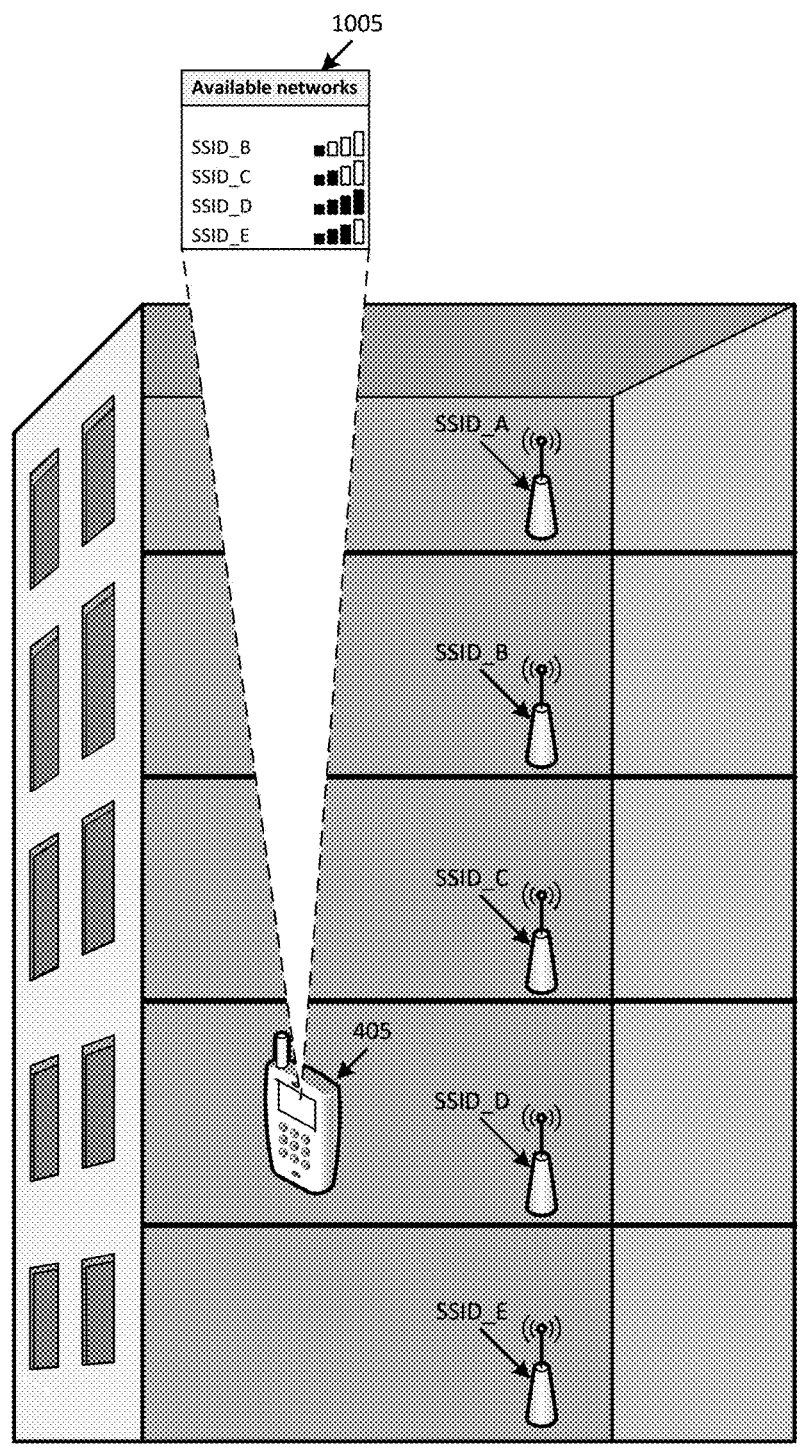
FIG. 10 conceptually illustrates an example situation in which a floor in a multi-story structure, on which a user device is located, may be identified based on a list of networks and/or devices that are visible to the user device.

FIG. 10 conceptually illustrates an example situation in which a floor in a multi-story structure, on which a user device is located, may be identified based on a list of networks and/or devices that are visible to the user device. In this example, user device 405 may be located on the second floor of a building. The building may include a Wi-Fi access point on each floor. Each Wi-Fi access point may broadcast an SSID (i.e., "SSID_A," "SSID_B," "SSID_C," "SSID_D," and "SSID_E" in this example). User interface 1005 may correspond to a user interface that is displayed by user device 405, and may indicate wireless networks that are visible to user device 405, and may also include signal strength indicators for the visible wireless networks. In this example, the signal strength indicators may be represented as "bars." In other implementations, signal strengths may be represented in some other fashion, including raw numeric values (e.g., numeric values that represent a signal strength measurement), normalized numeric values, and/or another type of graphical indicator.

As shown, the networks with SSIDs "SSID_B," "SSID_C," "SSID_D," and "SSID_E" may be visible to user device 405, and the network with SSID "SSID_A" may not be visible to user device 405 (e.g., user device 405 may be out of range of the access point that corresponds to "SSID_A"). The network with SSID "SSID_D" may have the highest signal strength with respect to user device 405, relative to the other visible networks. As also shown, the network with SSID "SSID_E" may have a higher signal strength than the network with SSID "SSID_C," even though these networks are one floor away from user device 405. This discrepancy may be based on, for example, different transmit powers associated with these networks, obstructions, and/or other sources of interference. The floor, on which user device 405 is located, may be able to be determined based on the visible network information and/or the signal strength information (e.g., in a manner similar to that described above with respect to FIG. 9).

Figure 11:
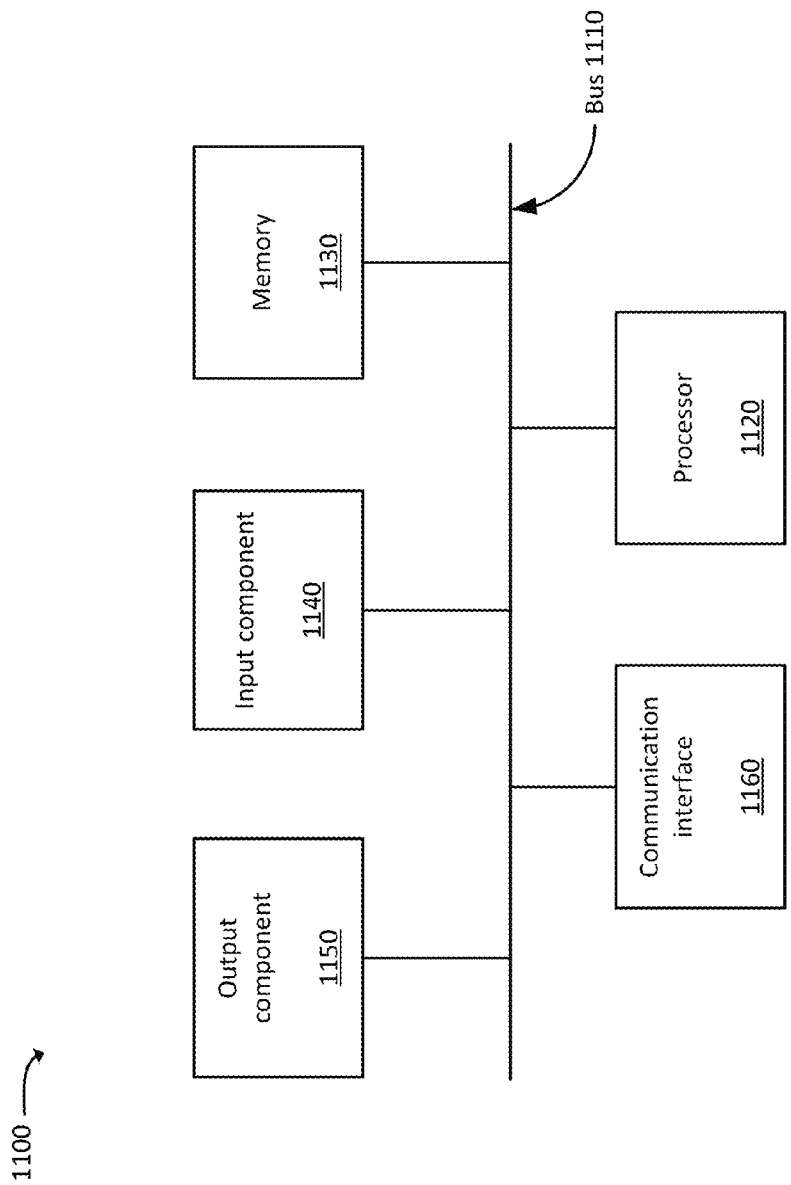
FIG. 11 illustrates example components of a device, in accordance with some implementations described herein.

FIG. 11 is a diagram of example components of device 1100. One or more of the devices described above may include one or more devices 1100. Device 1100 may include bus 1110, processor 1120, memory 1130, input component 1140, output component 1150, and communication interface 1160. In another implementation, device 1100 may include additional, fewer, different, or differently arranged components.

Bus 1110 may include one or more communication paths that permit communication among the components of device 1100. Processor 1120 may include a processor, microprocessor, or processing logic that may interpret and execute instructions. Memory 1130 may include any type of dynamic storage device that may store information and instructions for execution by processor 1120, and/or any type of non-volatile storage device that may store information for use by processor 1120.

Input component 1140 may include a mechanism that permits an operator to input information to device 1100, such as a keyboard, a keypad, a button, a switch, etc. Output component 1150 may include a mechanism that outputs information to the operator, such as a display, a speaker, one or more light emitting diodes ("LEDs"), etc.

Communication interface 1160 may include any transceiver-like mechanism that enables device 1100 to communicate with other devices and/or systems. For example, communication interface 1160 may include an Ethernet interface, an optical interface, a coaxial interface, or the like. Communication interface 1160 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1100 may include more than one communication interface 1160. For instance, device 1100 may include an optical interface and an Ethernet interface.

Device 1100 may perform certain operations relating to one or more processes described above. Device 1100 may perform these operations in response to processor 1120 executing software instructions stored in a computer-readable medium, such as memory 1130. A computer-readable medium may be defined as a non-transitory memory device. A memory device may include space within a single physical memory device or spread across multiple physical memory devices. The software instructions may be read into memory 1130 from another computer-readable medium or from another device. The software instructions stored in memory 1130 may cause processor 1120 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while FIGS. 8 and 9 are described separately, in some implementations, some or all of processes 800 and 900 may both be used to determine a floor of a building, on which user device 405 is located. Further, while process 800 describes one possible way in which an altitude of user device 405 may be determined, other techniques are possible. For example, user device 405 may include, or may be associated with, an altimeter that determines an altitude of user device 405. The altitude, measured by the altimeter, may be used (e.g., at 825) to determine the floor on which user device 405 is located.

As another example, while example data structures are illustrated in FIGS. 5-7 as including certain types of information, in practice, these data structures may store additional, fewer, different, or differently arranged types of information than shown in these figures. Furthermore, while these data structures are shown as tables, in practice, these data structures may take the form of any other type of data structure, such as an array, a linked list, a hash table, a tree, and/or any other type of data structure. Additionally, while series of blocks have been described with regard to FIGS. 8 and 9, the order of the blocks may be modified in other implementations. Further, non-dependent blocks may be performed in parallel.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations are described herein in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method, comprising:
   storing, by a server device, information regarding each of a plurality of floors of a building;
   receiving, by the server device, an indication that a call has been placed by a user device, wherein the call is placed after the information, regarding the plurality of floors, has been stored by the server device;
   determining, by the server device, a particular floor, of the plurality of floors of the building, in which the user device is located at a time the call was placed, the determining including:
      receiving information identifying a plurality of personal area network ("PAN") devices that are visible to the user device at the time the call was placed,
      receiving signal strength information associated with the plurality of PAN devices that are visible to the user device,
      comparing the signal strength information, associated with each particular PAN device, of the plurality of PAN devices, to a transmit power associated with each respective particular PAN device, of the plurality of PAN devices,
      receiving a first atmospheric pressure reading generated by a barometer, associated with the user device, at the time the call was placed,
      determining a location associated with the user device,
      obtaining reference barometric information based on the determined location, the reference barometric information including:
         a second atmospheric pressure reading, and
         an altitude at which the second atmospheric pressure was measured, and
      determining an altitude of the user device based on:
         the first atmospheric pressure reading, and
         the reference barometric information,
      wherein the floor is determined based on:
         the comparison of the signal strength information to the transmit power associated with each respective particular PAN device that is visible to the user device, and
         the altitude of the user device;
   identifying, by the server device, additional information associated with the determined floor on which the user device is located at the time the call was placed, the additional information being identified from the information that was stored by the server device prior to the call being placed; and
   outputting, by the server device and to a callee of the call, information indicating the determined floor and the identified additional information associated with the determined floor.

2. The method of claim 1, wherein determining the floor further includes:
   receiving building layout information that correlates ranges of altitudes to floors of the building, and
   determining the floor further based on the building layout information.

3. The method of claim 1, wherein determining the altitude of the user device further includes:
   receiving an altitude reading generated by an altimeter associated with the user device; and
   determining the altitude further based on the altitude reading generated by the altimeter of the user device.

4. The method of claim 1, wherein the information identifying the plurality of PAN devices includes an identification of at least one PAN device to which the user device is not connected.

5. The method of claim 1, wherein the callee is a public safety answering point ("PSAP").

6. A server device, comprising:
   a memory device storing:
      a set of processor-executable instructions,
      information regarding each of a plurality of floors of a building; and
   a processor configured to execute the processor-executable instructions, wherein executing the computer-executable instructions causes the processor to:
      receive an indication that a call has been placed by a user device, wherein the indication is received after the information regarding the plurality of floors has been stored by the server device;
      determine a particular floor, of the plurality of floors of the building, in which a user device is located when a call was placed by the user device, the instructions to determine the floor further including instructions to:
         receive information identifying a plurality of personal area network ("PAN") devices that are visible to the user device at a time the call was placed, receive signal strength information associated with the plurality of PAN devices that are visible to the user device, compare the signal strength information, associated with each particular PAN device, of the plurality of PAN devices, to a transmit power associated with each respective particular PAN device, of the plurality of PAN devices, receive a first atmospheric pressure reading generated by a barometer, associated with the user device, at the time the call was placed, determine a location associated with the user device, obtain reference barometric information based on the determined location, the reference barometric information including:
 a second atmospheric pressure reading, and
 an altitude at which the second atmospheric pressure was measured, and determine an altitude of the user device based on:
 the first atmospheric pressure reading, and
 the reference barometric information, wherein the floor is determined based on:
 the comparison of the signal strength information to the transmit power associated with each respective particular PAN device that is visible to the user device, and
 the altitude of the user device;

identify additional information associated with the determined floor on which the user device is located at the time the call was placed, the additional information being identified from the information that was stored by the server device prior to the call being placed; and output, to a callee of the call, information indicating the determined floor and the identified additional information associated with the determined floor.

7. The server device of claim 6, wherein executing the processor-executable instructions, to determine the floor, further causes the processor to:
 receive building layout information that correlates ranges of altitudes to floors of the building, and
 determine the floor further based on the building layout information.

8. The server device of claim 7, wherein the altitude of the user device is determined further based on a received altitude reading generated by an altimeter associated with the user device.

9. The server device of claim 6, wherein the information identifying the plurality of PAN devices includes an identification of at least one PAN device to which the user device is not connected.

10. The method of claim 4, wherein the at least one PAN device, to which the user device is not connected, broadcasts an identifier associated with the at least one PAN device, the method further comprising:
 storing the identifier with information indicating on which floor of the building the at least one PAN device is located,
 wherein receiving the information identifying the plurality of PAN devices that are visible to the device includes receiving the broadcasted identifier associated with the at least one PAN device, to which the user device is not connected.

11. The method of claim 1, wherein the additional information includes access codes to one or more doors of the building.

12. The method of claim 1, wherein the additional information includes one or more room numbers associated with one or more of the PAN devices.

13. The server device of claim 6, wherein the additional information includes access codes to one or more doors of the building.

14. The server device of claim 6, wherein the additional information includes one or more room numbers associated with one or more of the PAN devices.

15. A non-transitory computer-readable medium storing a plurality of processor-executable instructions, which when executed by one or more processors of a server device, cause the one or more processors to:
 store, in a memory device associated with the server device, information regarding each of a plurality of floors of a building;
 receive an indication that a call has been placed by a user device, wherein the call is placed after the information, regarding the plurality of floors, has been stored by the server device;
 determine a particular floor, of the plurality of floors of the building, in which the user device is located at a time the call was placed, wherein the processor-executable instructions to determine the particular floor include processor-executable instructions to:
  receive information identifying a plurality of personal area network ("PAN") devices that are visible to the user device at the time the call was placed,
  receive signal strength information associated with the plurality of PAN devices that are visible to the user device,
  compare the signal strength information, associated with each particular PAN device, of the plurality of PAN devices, to a transmit power associated with each respective particular PAN device, of the plurality of PAN devices,
  receive a first atmospheric pressure reading generated by a barometer, associated with the user device, at the time the call was placed,
  determine a location associated with the user device,
  obtain reference barometric information based on the determined location, the reference barometric information including:
   a second atmospheric pressure reading, and
   an altitude at which the second atmospheric pressure was measured, and
  determine an altitude of the user device based on:
   the first atmospheric pressure reading, and
   the reference barometric information,
  wherein the floor is determined based on:
   the comparison of the signal strength information to the transmit power associated with each respective particular PAN device that is visible to the user device, and
   the altitude of the user device;
 identify additional information associated with the determined floor on which the user device is located at the time the call was placed, the additional information being identified from the information that was stored by the server device prior to the call being placed; and
 output, to a callee of the call, information indicating the determined floor and the identified additional information associated with the determined floor.

16. The non-transitory computer-readable medium of claim 15, wherein the processor-executable instructions, to determine the floor, further include processor-executable instructions to:

receive building layout information that correlates ranges of altitudes to floors of the building, and determine the floor further based on the building layout information.

17. The non-transitory computer-readable medium of claim 15, wherein the processor-executable instructions, to determine the altitude of the user device further include processor-executable instructions to:

receive an altitude reading generated by an altimeter associated with the user device; and determine the altitude further based on the altitude reading generated by the altimeter of the user device.

18. The non-transitory computer-readable medium of claim 15, wherein the information identifying the plurality of PAN devices includes an identification of at least one PAN device to which the user device is not connected.

19. The non-transitory computer-readable medium of claim 18, wherein the at least one PAN device, to which the user device is not connected, broadcasts an identifier associated with the at least one PAN device, wherein the processor-executable instructions further cause the one or more processors to:

store, in the memory device, the identifier with information indicating on which floor of the building the at least one PAN device is located, wherein receiving the information identifying the plurality of PAN devices that are visible to the device includes receiving the broadcasted identifier associated with the at least one PAN device, to which the user device is not connected.

20. The non-transitory computer-readable medium of claim 15, wherein the additional information includes at least one of:

access codes to one or more doors of the building, or one or more room numbers associated with one or more of the PAN devices.

* * * * *